United States Patent
Harada

(10) Patent No.: US 8,102,473 B2
(45) Date of Patent: Jan. 24, 2012

(54) IMAGE CORRECTION CIRCUIT, IMAGE CORRECTION METHOD AND IMAGE DISPLAY

(75) Inventor: Shigeru Harada, Tokyo (JP)

(73) Assignee: Sony Corporation, Tokyo (JP)

( * ) Notice: Subject to any disclaimer, the term of this patent is extended or adjusted under 35 U.S.C. 154(b) by 1302 days.

(21) Appl. No.: 11/742,881

(22) Filed: May 1, 2007

(65) Prior Publication Data

US 2007/0285577 A1 Dec. 13, 2007

(30) Foreign Application Priority Data

May 16, 2006 (JP) ................................ P2006-136461

(51) Int. Cl.
*H04N 5/52* (2006.01)
*H04N 5/57* (2006.01)
*H04N 5/14* (2006.01)

(52) U.S. Cl. ......... 348/678; 348/687; 348/689; 348/690

(58) Field of Classification Search .................. 348/674, 348/643, 645, 646, 649–651, 675, 671, 678, 348/679, 687, 689, 690; *H04N 5/202, 9/69, H04N 9/70, 9/68, 9/64, 5/52, 5/57, 5/18, H04N 5/14*

See application file for complete search history.

(56) References Cited

U.S. PATENT DOCUMENTS

| 4,489,349 A | * | 12/1984 | Okada .......................... 348/674 |
| 5,115,269 A | | 5/1992 | Masanaga et al. |
| 6,141,047 A | | 10/2000 | Kawai et al. |
| 2003/0112378 A1 | * | 6/2003 | Okunuki et al. .............. 348/687 |

FOREIGN PATENT DOCUMENTS

EP 0 866 608 A2 9/1998

* cited by examiner

*Primary Examiner* — Sherrie Hsia
(74) *Attorney, Agent, or Firm* — Oblon, Spivak, McClelland, Maier & Neustadt, L.L.P.

(57) ABSTRACT

An image correction circuit capable of preventing a loss of gray levels in a luminance region at the time of the direct current level conversion of a luminance signal to improve the quality of a displayed image. The image correction circuit detects an average peak level of input image data in each image frame, and corrects the input image data to lower the luminance of input image data in an intermediate luminance region according to the average peak level while reducing the luminance of input image data at a predetermined rate in at least of a low luminance region.

14 Claims, 10 Drawing Sheets

IMAGE CORRECTION CIRCUIT, IMAGE CORRECTION METHOD AND IMAGE DISPLAY

CROSS REFERENCES TO RELATED APPLICATIONS

The present invention contains subject matter related to Japanese Patent Application JP 2006-136461 filed in the Japanese Patent Office on May 16, 2006, the entire contents of which being incorporated herein by reference.

BACKGROUND OF THE INVENTION

1. Field of the Invention

The present invention relates to an image correction circuit having a function of performing a correction process on an image signal, an image correction method and an image display.

2. Description of the Related Art

Apparatuses such as television receivers, VCRs (Video Cassette Recorders), digital cameras, television cameras or printers typically have an image processing function which makes image quality correction to an input image, and then outputs the input image (for example, functions such as luminance or contrast control, and contour correction). Such a function is effectively applied mainly to a totally dark and low-contrast image or a blurred image.

Among image processing circuits having such a function, a DC transmission rate circuit has a function of lowering a DC component (a direct current level) according to the magnitude of an average peak level (APL) in each image frame of input image data (for example, refer to Japanese Examined Patent Application Publication No. H2-47155). More specifically, in the case where the average peak level is high (bright), an average displayed image is obtained by shifting the whole image to darker side. Such a DC shift (a direct current level conversion) corresponds to human eye sensibility (which obtains a certain average amount of light by closing an eye's iris when it is bright, and opening the eye's iris when it is dark), so the DC transmission rate circuit achieves a high effect on improvement in the image quality of a displayed image.

SUMMARY OF THE INVENTION

However, in such a DC transmission rate circuit in a related art, for example, as shown by input/output characteristics in FIG. 15, an original characteristic line L110 is subjected to DC fluctuation according to an average peak level, as shown by a characteristic line L111, a part P101 in which the gray level does not change is generated in a low luminance region (a black level region) L101 in principle. In other words, a loss of gray levels occurs in a part of the black level region, so it is difficult to display gray levels in the part, thereby the quality of a displayed image declines.

Moreover, in such a DC transmission rate circuit in the related art, for example, as shown by a characteristic line L111 in FIG. 15, the luminance level in a high luminance region (a white level region) declines (by a part shown by P102) in principle. Therefore, also from this viewpoint, the quality of a displayed image declines.

In view of the foregoing, it is desirable to provide an image correction circuit capable of preventing a loss of gray levels in a low luminance region at the time of the direct current level conversion of a luminance signal to improve the quality of a displayed image, an image correction method and an image display.

Moreover, it is desirable to provide an image correction circuit capable of preventing a decline in the luminance level on a high luminance side at the time of direct current level conversion of a luminance signal to improve the quality of a displayed image, an image correction method and an image display.

According to an embodiment of the invention, there is provided a first image correction circuit including: a luminance detection means for detecting an average peak level of input image data in each image frame; and an image correction means for correcting the input image data so as to lower the luminance of input image data in an intermediate luminance region according to the average peak level while reducing the luminance of input image data at a predetermined rate in at least of a low luminance region.

According to an embodiment of the invention, there is provided a first image correction method including the steps of: detecting an average peak level of input image data in each image frame; and correcting input image data so as to lower the luminance of input image data in an intermediate luminance region according to the average peak level while reducing the luminance of input image data at a predetermined rate in at least of a low luminance region.

According to an embodiment of the invention, there is provided a first image display including: a luminance detection means for detecting an average peak level of input image data in each image frame; an image correction means for correcting input image data so as to lower the luminance of input image data in a low luminance region according to the average peak level while reducing the luminance of input image data at a predetermined rate in at least of a low luminance region; and a display means for displaying an image on the basis of the corrected input image data.

In the first image correction circuit, the first image correction method and the first image display according to the embodiment of the invention, while the luminance of the input image data in the intermediate luminance region is lowered according to the average peak level, the luminance of the input image data in at least of the low luminance region is reduced at a predetermined rate. In this case, "reduced at a predetermined rate" means that an output is increased or decreased with an increase or a decrease in input. Therefore, while direct current level conversion is performed in the intermediate luminance region, a loss of gray levels in the low luminance region of the input image data after the conversion can be prevented.

In the first image correction circuit according to the embodiment of the invention, the image correction means can include a function determination means for determining an image correction function, the image correction function including an intermediate luminance function part and a low luminance function part, the intermediate luminance function part converting the direct current level of the input image data in the intermediate luminance region according to the detected average peak level, the low luminance function part continuously connecting between a minimum luminance point of the input image data and the intermediate luminance function part; and a correction execution means for executing image correction on the input image data on the basis of the determined image correction function. In this case, "an image correction function" means a function defining a relationship between the luminance signal of input image data and the luminance signal of corrected image data.

In the first image correction circuit according to the embodiment of the invention, it is preferable that the image correction means corrects the input image data so as to continuously connect between a maximum luminance point of the input image data and an intermediate luminance region while maintaining a maximum luminance point of the input image data as it is. In such a case, the maximum luminance point of the input image data is not lowered and is maintained, so a decline in the luminance level in the high luminance region can be prevented.

According to an embodiment of the invention, there is provided a second image correction circuit including: a luminance detection means for detecting an average peak level of input image data in each image frame; and an image correction means for correcting input image data so as to lower the luminance of input image data in an intermediate luminance region according to the average peak level while maintaining a maximum luminance point of input image data as it is.

According to an embodiment of the invention, there is provided a second image correction method including the steps of: detecting an average peak level of input image data in each image frame; and correcting input image data so as to lower the luminance of input image data in an intermediate luminance region according to the average peak level while maintaining a maximum luminance point of input image data as it is.

According to an embodiment of the invention, there is provided a second image display including: a luminance detection means for detecting an average peak level of input image data in each image frame; an image correction means for correcting input image data so as to lower the luminance of input image data in an intermediate luminance region according to the average peak level while maintaining a maximum luminance point of input image data as it is; and a display means for displaying an image on the basis of the corrected input image data.

In the second image correction circuit, the second image correction method and the second image display according to the embodiment of the invention, while the luminance of the input image data in the intermediate luminance region is lowered according to the average peak level, the maximum luminance point of the input image data is maintained as it is. Therefore, while direct current level conversion is performed in the intermediate luminance region, a decline in the luminance level in the high luminance region of input image data after the conversion can be prevented.

In the first image correction circuit, the first image correction method or the first image display according to the embodiment of the invention, while the luminance of the input image data in at least of the low luminance region is reduced at a predetermined rate, the luminance of the input image data in the intermediate luminance region is lowered according to the average peak level, so even if direct current level conversion is performed in the intermediate luminance region, a loss of gray levels in the low luminance region after the conversion can be prevented. Therefore, gray levels in the low luminance region can be reliably displayed, and the quality of a displayed image can be improved.

Moreover, in the second image correction circuit, the second image correction method or the second image display according to the embodiment of the invention, while the maximum luminance point of the input image data is maintained as it is, the luminance of the input image data in the intermediate luminance region is lowered according to the average peak level, so even if direct current level conversion is performed in the intermediate luminance region, a decline in the luminance level in the high luminance region after the conversion can be prevented. Therefore, gray levels in the high luminance region can be reliably displayed, and the quality of a displayed image can be improved.

Other and further objects, features and advantages of the invention will appear more fully from the following description.

DETAILED DESCRIPTION OF THE PREFERRED EMBODIMENTS

Preferred embodiments will be described in detail below referring to the accompanying drawings.

First Embodiment

Figure 1:
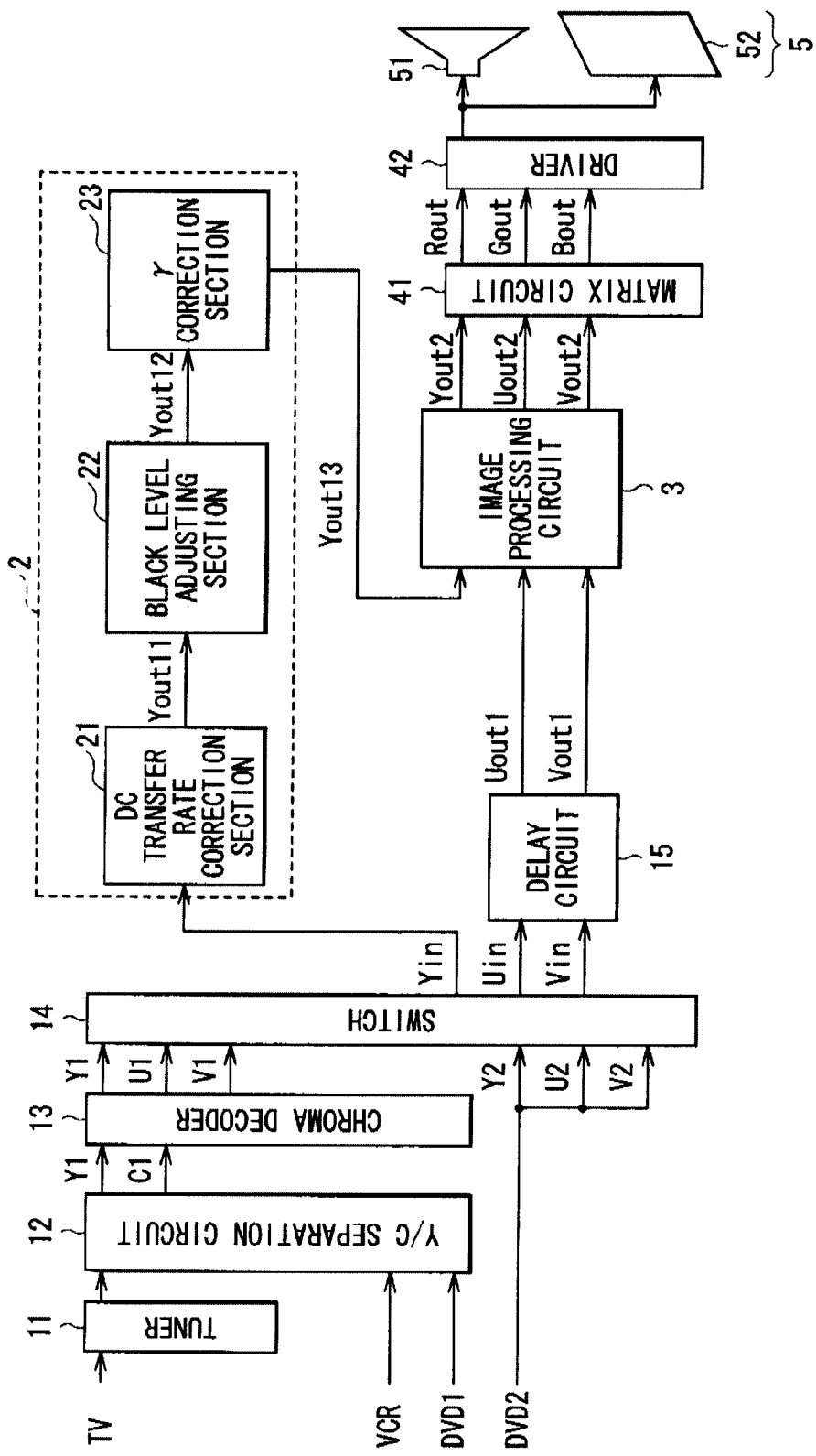
FIG. 1 is a circuit block diagram showing the whole configuration of an image display according to a first embodiment of the invention.

FIG. 1 shows the whole configuration of an image display according to a first embodiment of the invention. The image display includes a image processing function section including a tuner 11, a Y/C separation circuit 12, a chroma decoder 13, a switch 14, a delay circuit 15, a luminance signal correction section 2 and an image processing circuit 3 and an image display function section including a matrix circuit 41, a driver 42 and a display 5. An image correction circuit and an image correction method according to a first embodiment of the invention are embodied by the image display according to the embodiment, so they will be also described below.

Image signals inputted into the image display may be outputs from a VCR (Video Cassette Recorder), a DVD (Digital Versatile Disc) or the like in addition to a TV signal from a TV (television). It has become common practice for recent televisions and personal computers (PCs) to obtain image information from a plurality of kinds of media and display an image corresponding to each of the media.

The tuner 11 receives and demodulates the TV signal from the TV, and outputs the TV signal as a composite video burst signal (CVBS).

The Y/C separation circuit 12 separates the composite video burst signal from the tuner 11 or a composite video burst signal from a VCR or a DVD1 into a luminance signal Y1 and a chrominance signal C1 to output them.

The chroma decoder 13 outputs the luminance signal Y1 and the chrominance signal C1 separated by the Y/C separation circuit 12 as YUV signals (Y1, U1, V1) including the luminance signal Y1 and color-difference signals U1 and V1.

The YUV signals are image data of a digital image, and a set of pixel values corresponding to a position on a two-dimensional image. A luminance signal Y represents a luminance level, and takes an amplitude value between a white level which is 100% white and a black level. Moreover, a 100% white image signal is 100 (IRE) in a unit called IRE (Institute of Radio Engineers) representing a relative ratio of an image signal. The black level is 0 IRE. On the other hand, the color-difference signals U and V correspond to a signal B-Y produced by subtracting the luminance signal Y from blue (B), and a signal R-Y produced by subtracting the luminance signal Y from red (R), respectively, and when the signals U and V are combined with the luminance signal Y, colors (color phases, chroma saturation, luminance) can be shown.

The switch 14 switches YUV signals from a plurality of kinds of media (in this case, the YUV signals (Y1, U1, V1) and YUV signals (Y2, U2, V2) from a DVD2) so as to output selected signals as YUV signals (Yin, Uin, Vin).

The luminance signal correction section 2 corrects the luminance signal Yin of the YUV signals (Yin, Uin, Vin) outputted from the switch 14, and includes a DC transmission rate correction section 21, a black level adjusting section 22 and a γ correction section 23.

Figure 2:
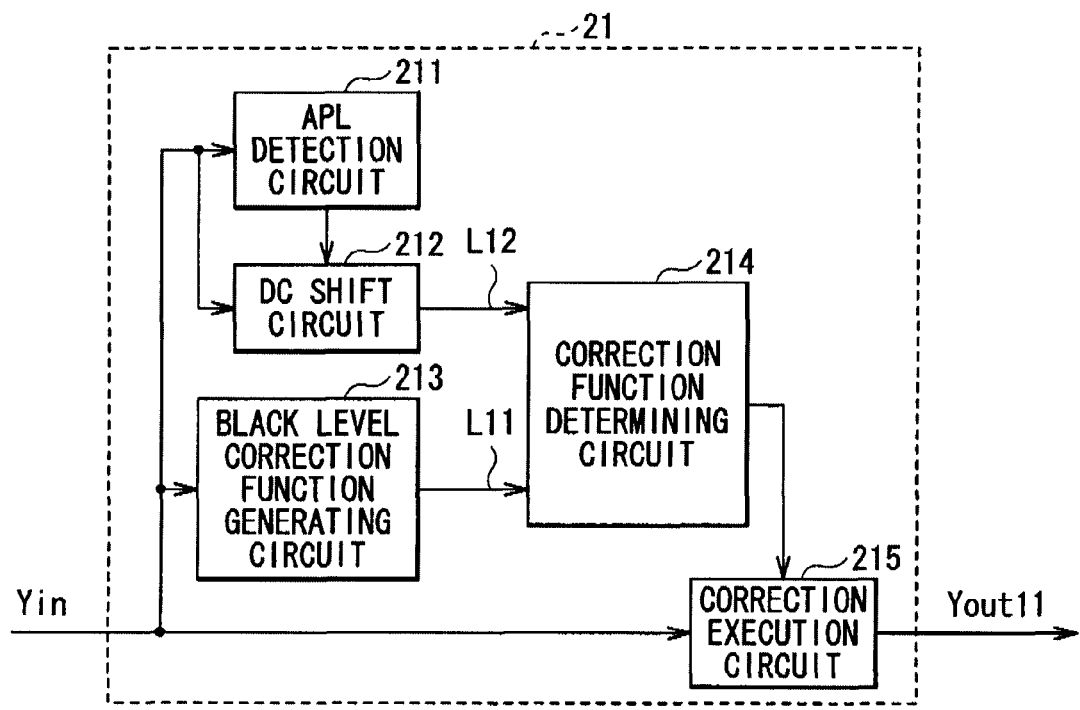
FIG. 2 is a circuit block diagram of a detailed configuration of a DC transmission rate correction section shown in FIG. 1.
Figure 3:
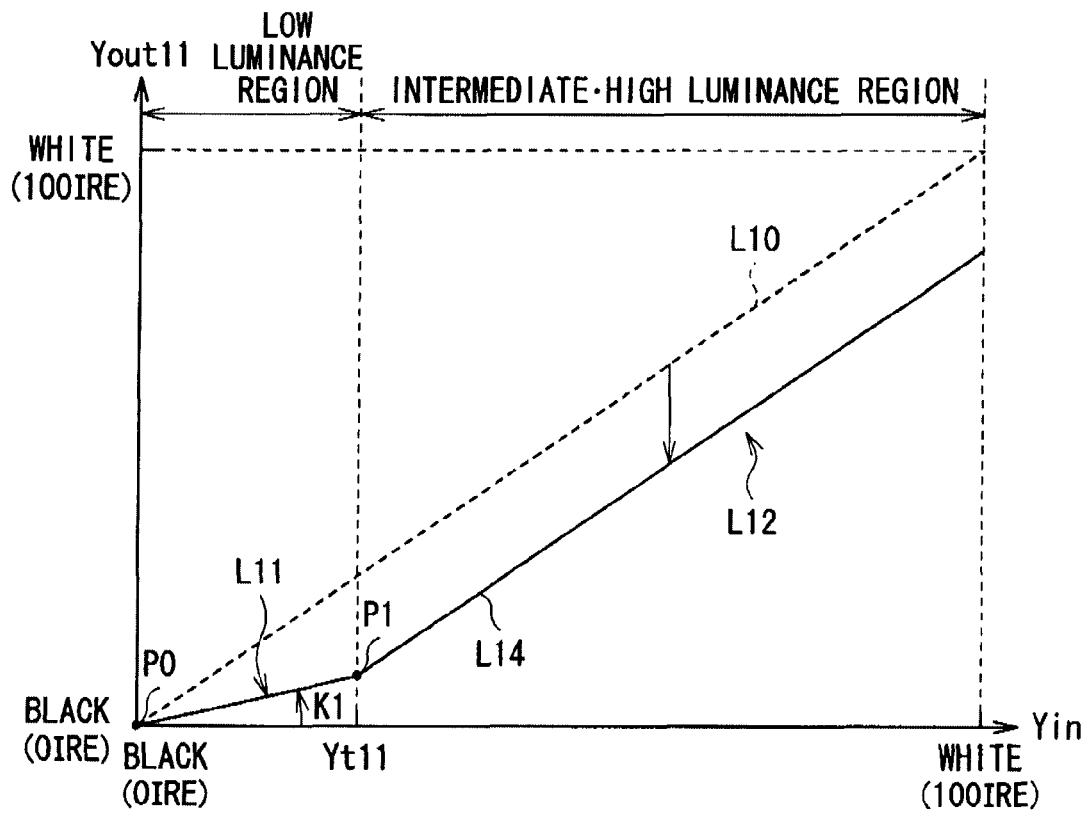
FIG. 3 is a plot showing an example of an image correction function according to the first embodiment.

FIG. 2 shows the circuit configuration of the DC transmission rate correction section 21. The DC transmission rate correction section 21 includes an APL detection circuit 211, a DC shift circuit 212, a black level correction function generating circuit 213, a correction function determining circuit 214 and a correction execution circuit 215. Moreover, FIG. 3 shows input/output characteristics in the DC transmission rate correction section 21, and shows an image correction function defining a relationship between an inputted luminance signal Yin and an outputted luminance signal Yout11. A line L10 in FIG. 3 shows a reference image correction function (before DC transmission rate correction) in which the inputted luminance Yin=outputted luminance Yout11.

The APL detection circuit 211 detects an average peak level (APL) in each image frame on the basis of the luminance signal Yin. The detected average peak level is outputted to the DC shift circuit 212.

For example, as shown in FIG. 3, the DC shift circuit 212 generates an intermediate•high luminance function part L12, which lowers a luminance level in an intermediate•high luminance region to lower than an original luminance level (the luminance level of the reference image correction function L10) according to the average peak level in each image frame detected by the APL detection circuit 211, in an image correction function (for example, an image correction function L14 in FIG. 3) in the DC transmission rate correction circuit 21. More specifically, the amount of DC shift is fixed irrespective of average luminance, and the whole image is shifted to darker side, thereby the intermediate•high luminance function part L12 is generated.

For example, as shown in FIG. 3, the black level correction function generating circuit 213 generates a low luminance function part (a black level correction function) L11, which is a part continuously connecting between a minimum luminance point P0 and the intermediate•high luminance function part L12 at a connection point P1 so as to reduce a luminance signal in a low luminance region from an original luminance level though at a predetermined rate, in the image correction function (for example, the image correction function L14 in FIG. 3) in the DC transmission rate correction circuit 21. For example, in FIG. 3, the low luminance function part L11 connects between the minimum luminance point P0 and the intermediate•high luminance function part L12 with a line with a predetermined change rate (a gradient K1). As a method of generating such a low luminance function part L11, the following two methods are cited.

Figure 4A:
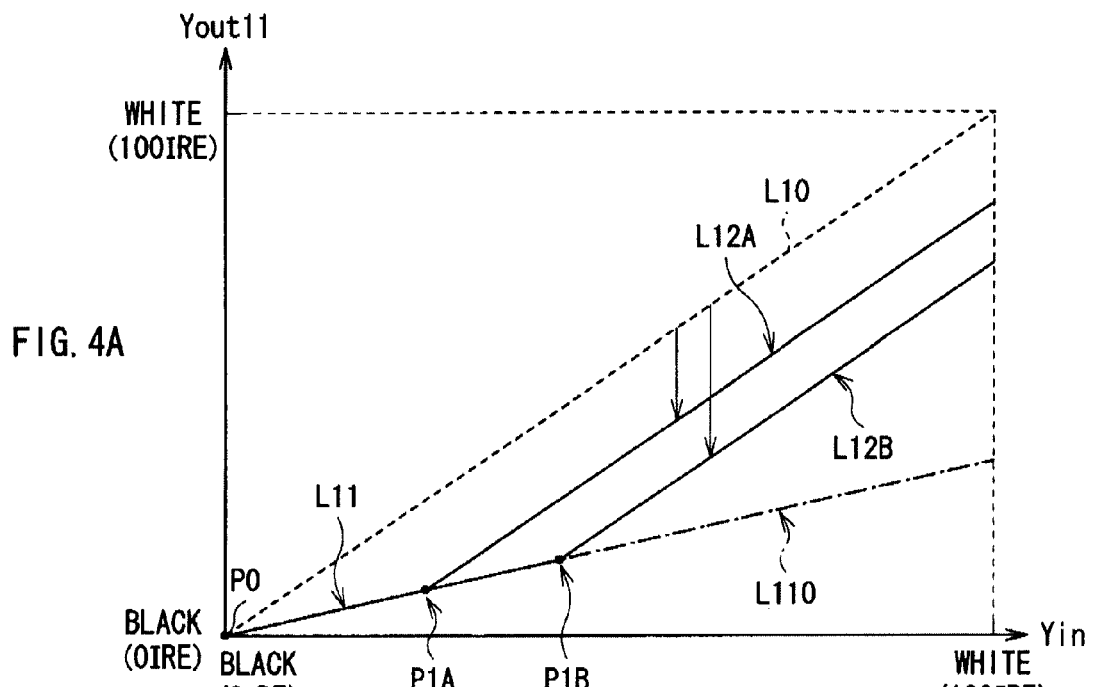
FIGS. 4A and 4B are plots for describing examples of a function generating operation by a black level correction function generating circuit.

At first, as one of the methods, for example, as shown in FIG. 4A, a line L110 having a given gradient except for 0 and passing through the minimum luminance point P0 is predetermined, and the points of intersection of the line L110 and intermediate•high luminance function parts (for example, intermediate•high luminance function parts L12A and L12B) are set as connection points (for example, connection points P1A and P1B) to the intermediate•high luminance function parts. In other words, irrespective of the DC fluctuation amounts of the intermediate•high luminance function parts, the low luminance function part L11 with a fixed gradient continuously connects to the intermediate•high luminance parts at the connection points along the line L110.

Figure 4B:
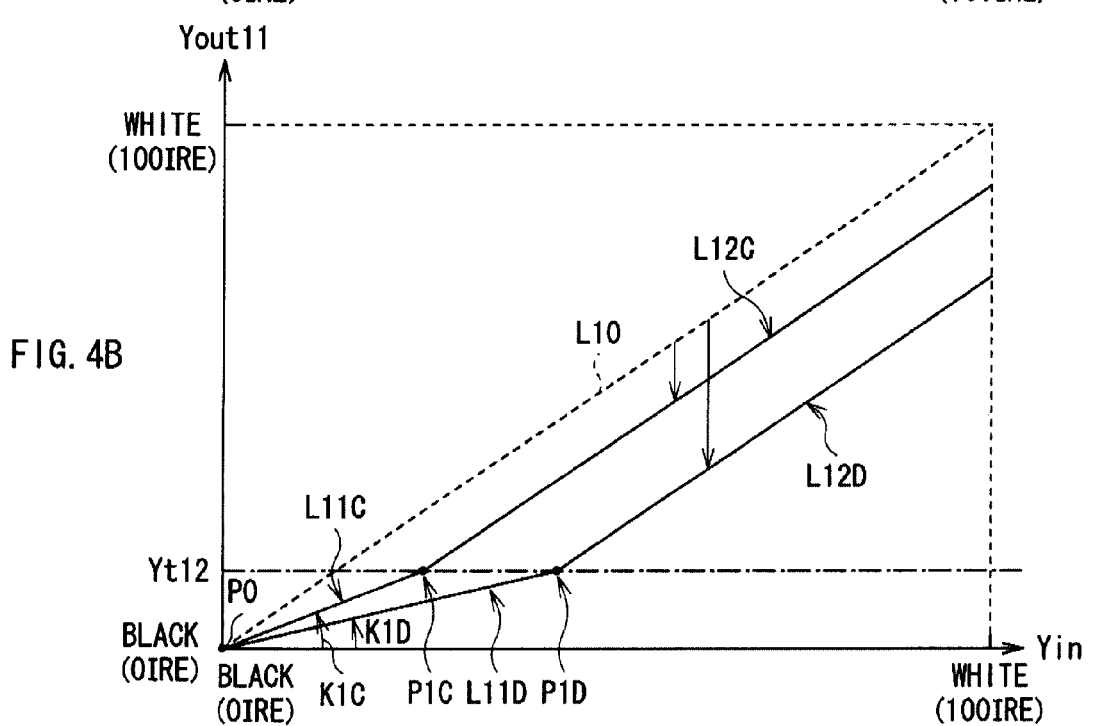

As another method, for example, as shown in FIG. 4B, a given output luminance Yt12 is predetermined, and points at which intermediate•high luminance function parts (for example, intermediate•high luminance function parts L12C and L12D) meet the output luminance Yt12 are set as connection points (for example, connection points P1C and P1D) to the intermediate•high luminance function parts. In other words, in the low luminance function parts L11C and L11D, the gradients of lines are changed according to the DC fluctuation amounts of the intermediate•high luminance function parts (for example, gradients K1C and K1D). A low luminance function part is represented by Formula 1, and an intermediate•high luminance function part is represented by Formula 2, and the output luminance at the point (connection point) of intersection of these function parts is Yt12, so the gradient K of the line in this case is represented by Formula 3. In other words, as the value of α in Formula 3 is increased with an increase in the DC fluctuation amount of the intermediate•high luminance function part, the gradient K of the line is decreased.

$$Yout11 = Yin - \alpha \quad (1)$$

$$Yout11 = K \times Yin \quad (2)$$

$$K = Yt12/(Yt12 + \alpha) \quad (3)$$

The low luminance function part L11 generated by the black level correction function generating circuit 213 in such a manner is outputted to the correction function determining circuit 214.

Referring back to FIG. 2, the correction function determining circuit 214 determines an image correction function (for example, an image correction function L14 in FIG. 3) including these function parts on the basis of the intermediate•high luminance function part L12 generated by the DC shift circuit 212 and the low luminance function part L11 generated by the black level correction function generating circuit 213.

Moreover, the correction execution circuit 215 actually corrects the luminance signal Yin from the switch 14 on the basis of the image correction function determined by the correction function determining circuit 214. The luminance signal corrected in such a manner is outputted to the black level adjusting section 22 as a luminance signal Yout11.

Figure 5:
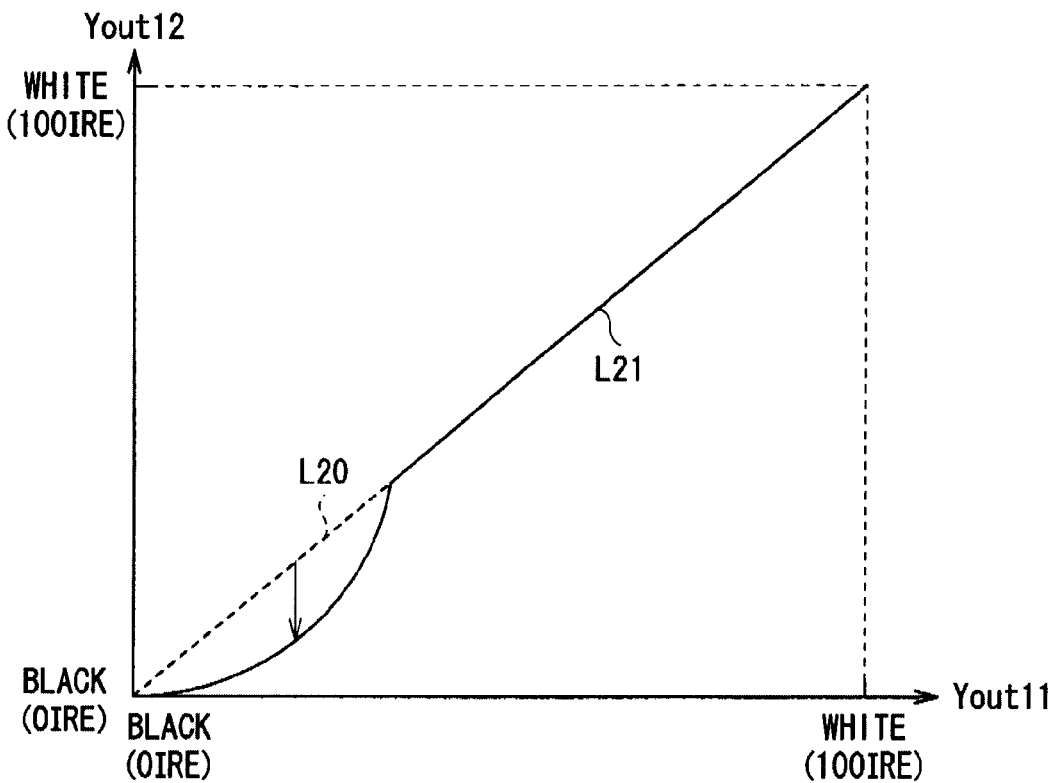
FIG. 5 is a plot for describing an operation of a black level adjusting section.

Referring back to FIG. 1, the black level adjusting section 22 detects a low luminance level region (a blackest level region) in an image frame on the basis of the inputted luminance signal Yout11, and in the case where the blackest level region exists in a certain area range, for example, as shown in FIG. 5, the black level adjusting section 22 shifts the luminance signal in the blackest level region to black side (the luminance level is lowered) so as to correct the luminance signal Yout11 to a luminance signal Yout12. Thus, in the black level adjusting section 22, the luminance signal is corrected so that a black level in a displayed image is enhanced, and the corrected luminance signal is outputted to the γ correction section 23 as the luminance signal Yout12.

Figure 6:
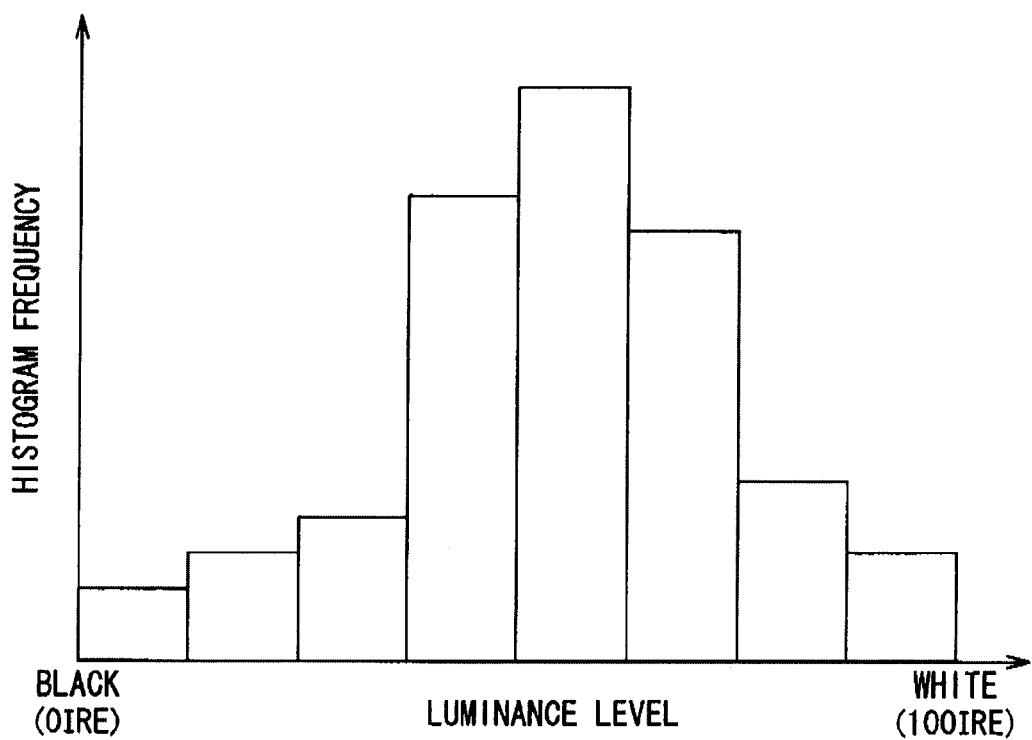
FIG. 6 is a plot showing a histogram distribution of a luminance level detected in a γ correction section.
Figure 7:
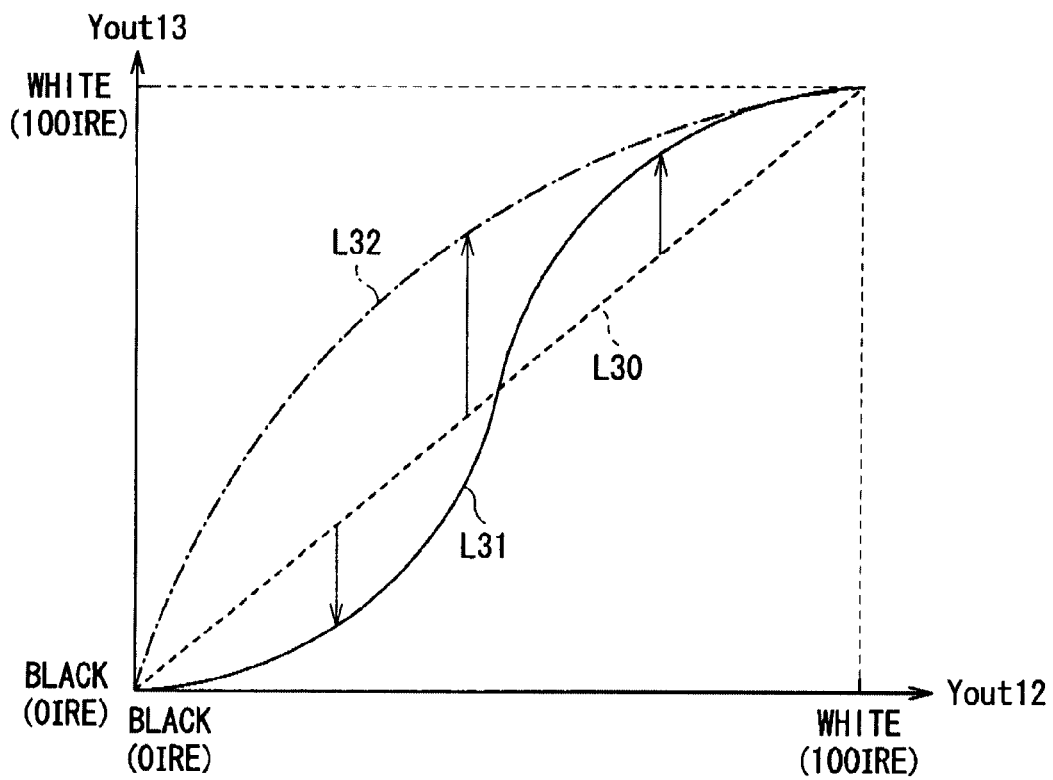
FIG. 7 is a plot for describing an operation of the γ correction section.

For example, as shown in FIG. 6, the γ correction section 23 detects the histogram distribution of the luminance signal in each image frame on the basis of the inputted luminance signal Yout12, and, for example, as shown in FIG. 7, the γ correction section 23 adaptively changes an input/output characteristic (a γ characteristic) (for example, changes a γ characteristic L30 into a γ characteristic L31 or L32) on the basis of the luminance histogram distribution, and corrects the luminance signal Yout12 into a luminance signal Yout13 on the basis of the γ characteristic. Thus, in the γ correction section 23, the luminance signal is corrected on the basis of the detected luminance histogram distribution so that the contrast is improved, and the corrected luminance signal is outputted to the image processing circuit 3 as the luminance signal Yout13.

The delay circuit 15 delays the color-difference signals Um and Vin outputted from the switch 14, and synchronizes the color-difference signals Um and Vin and the corrected luminance signal Yout13 outputted from the luminance signal correction section 2 to output them to the image processing circuit 3.

The image processing circuit 3 performs predetermined image processing such as, for example, sharpness processing on the corrected luminance signal Yout13 outputted from the luminance signal correction section 2 and UV signals (Uout1, Vout1) which are outputted from the switch 14 and pass through the delay circuit 15. The YUV signals (Yout2, Uout2, Vout2) after image processing in such a manner are outputted to the matrix circuit 41.

The matrix circuit 41 reproduces RGB signals from the YUV signals (Yout2, Uout2, Vout2) after image processing by the image processing circuit 3, and outputs the reproduced RGB signals (Rout, Gout, Bout) to the driver 42.

The driver 42 produces a driving signal for the display 5 on the basis of the RGB signals (Rout, Gout, Bout) outputted from the matrix circuit 41, and outputs the driving signal to the display 5.

The display 5 displays an image on the basis of the YUV signals (Yout2, Uout2, Vout2) after the luminance signal is corrected by the luminance signal correction section 2, and image processing is performed by the image processing circuit 3 according to the driving signal outputted from the driver 42. The display 5 may be any kind of display device. For example, a CRT (Cathode-Ray Tube) 51, a LCD (Liquid Crystal Display) 52, a PDP (Plasma Display Panel; not shown) or the like is used.

The YUV signals (Yin, Uin, Vin) correspond to specific examples of "input image data" in the invention. The DC transmission rate correction section 21 corresponds to a specific example of "an image correction circuit" in the invention, and the APL detection circuit 211 corresponds to a specific example of "a luminance detection means" in the invention, and the DC shift circuit 212, the black level correction function generating circuit 213, the correction function determining circuit 214 and the correction execution circuit 215 correspond to specific examples of "an image correction means" in the invention. The DC shift circuit 212, the black level correction function generating circuit 213 and the correction function determining circuit 214 correspond to specific examples of "a function determination means" in the invention, and the correction execution circuit 215 corresponds to a specific example of "a correction execution means" in the invention.

Next, the operation of the image display according to the embodiment will be described below.

At first, an image signal to be inputted into the image display is demodulated into the YUV signals. More specifically, a TV signal from the TV is demodulated into a composite video burst signal by the tuner 11, and a composite video burst signal is directly inputted into the image display from the VCR or the DVD1. Then, the composite video burst signals are separated into the luminance signal Y1 and the chrominance signal C1 in the Y/C separation circuit 12, and then the luminance signal Y1 and the chrominance signal C1 are decoded into the YUV signals (Y1, U1, V1) in the chroma decoder 13. On the other hand, YUV signals (Y2, U2, V2) are directly inputted into the image display from the DVD2.

Next, in the switch 14, either the YUV signals (Y1, U1, V1) or the YUV signals (Y2, U2, V2) are selected to be outputted as the YUV signals (Yin, Uin, Vin). Then, the luminance signal Yin of the YUV signals (Yin, Uin, Vin) is outputted into the luminance signal correction section 2, and the color-difference signals Uin and Vin are outputted to the delay circuit 15.

In the luminance signal correction section 2, the following operation of correcting the luminance signal is performed on the basis of the inputted luminance signal Yin.

At first, in the DC transmission rate correction section 21, the APL detection circuit 211 detects the average peak level in each image frame on the basis of the inputted luminance signal Yin, and the DC shift circuit 212 generates the intermediate•high luminance function part L12 which lowers the luminance level in the intermediate•high luminance region according to the detected average peak level. On the other hand, the black level correction function generating circuit 213 generates the low luminance function part L11 which is a part continuously connecting between the minimum luminance point P0 and the intermediate•high luminance function part L12 at the connection point P1 so as to reduce the luminance signal in the low luminance region though at a predetermined rate. Then, the correction function determining circuit 214 determines the image correction function including the intermediate•high luminance function part L12 and the low luminance function part L11, and the correction execution circuit 215 corrects the luminance signal Yin from the switch 14 on the basis of the determined image correction function.

As described above, the determined image correction function is generated so that the input luminance signal is lowered according to the average peak level in the intermediate•high luminance region, and the input luminance signal is maintained at a level lower than an original level in the low luminance region (refer to the intermediate•high luminance function part L12 and the low luminance function part L11 in FIG. 3), so while the DC level conversion is performed in the intermediate•high luminance region, a loss of gray levels in the low luminance region of the converted luminance signal can be prevented.

Next, the black level adjusting section 22 detects the blackest level region in the image frame on the basis of the luminance signal Yout11, and in the case where the blackest level region exists in a certain area range, the black level adjusting section 22 shifts the luminance signal in the blackest level region to black side (the luminance level is lowered) so as to correct the luminance signal so that the black level in the displayed image is enhanced. Then, the γ correction section 23 detects the luminance histogram distribution in each image frame on the basis of the luminance signal Yout12, and corrects the luminance signal on the basis of the characteristic adaptively changed according to the luminance histogram distribution so that the contrast is improved. The luminance signal corrected in such a manner is outputted to the image processing circuit 3 as the luminance signal Yout13.

On the other hand, the delay circuit 15 delays the color-difference signals Uin and Vin, and as a result, the color-difference signals Um and Vin and the luminance signal Yout13 outputted from the luminance signal adjusting section 2 are synchronized.

Next, the image processing circuit 3 performs predetermined image processing such as, for example, sharpness processing on the corrected luminance signal Yout13 outputted from the luminance signal correction section 2 and the UV signals (Uout1, Vout1) which are outputted from the switch 14 and pass through the delay circuit 15.

Then, the matrix circuit 41 reproduces RGB signals (Rout, Gout, Bout) from the YUV signals (Yout2, Uout2, Vout2) after image processing, and the driver 42 produces a driving signal on the basis of the RGB signals (Rout, Gout, Bout), and an image is displayed on the display 5 on the basis of the driving signal.

As described above, in the embodiment, in the DC transmission rate correction section 21, while the luminance signal level in the low luminance region is reduced from the original luminance signal level though at a predetermined rate, the luminance signal level in the intermediate•high luminance region is lowered according to the average peak level detected by the APL detection circuit 211, so even if the DC level conversion is performed in the intermediate•high luminance region as in the case of a related art, a loss of gray levels in the low luminance region after the conversion can be prevented. Therefore, gray levels in the low luminance region can be reliably displayed, and the quality of a displayed image can be improved.

Moreover, for example, as shown in FIGS. 3, 4A and 4B, the low luminance function part is represented by a line continuously connecting between the minimum luminance point P0 and the intermediate•high luminance function part, so the image correction function including these function parts can be easily generated. Therefore, the configurations of the black level correction function generating circuit 213 and the correction function determining section 214 can be simplified, and the circuit sizes can be reduced.

Further, in the correction function determining circuit 214, in the low luminance region, a smaller value (the low luminance function part) is selected and determined between the intermediate•high luminance function part and the low luminance function part, so also in this viewpoint, the image correction function can be easily generated.

[Modification]

Next, a modification of the first embodiment will be described below. In the modification, for example, as shown by an image correction function L14A in FIG. 8, in the DC transmission rate correction section 21, a low luminance function part which includes a part L11A passing through the minimum luminance point P0 and having the same shape as the image correction function L10 before DC level conversion is generated, and the luminance signal is corrected by the image correction function including such a low luminance function part.

Figure 8:
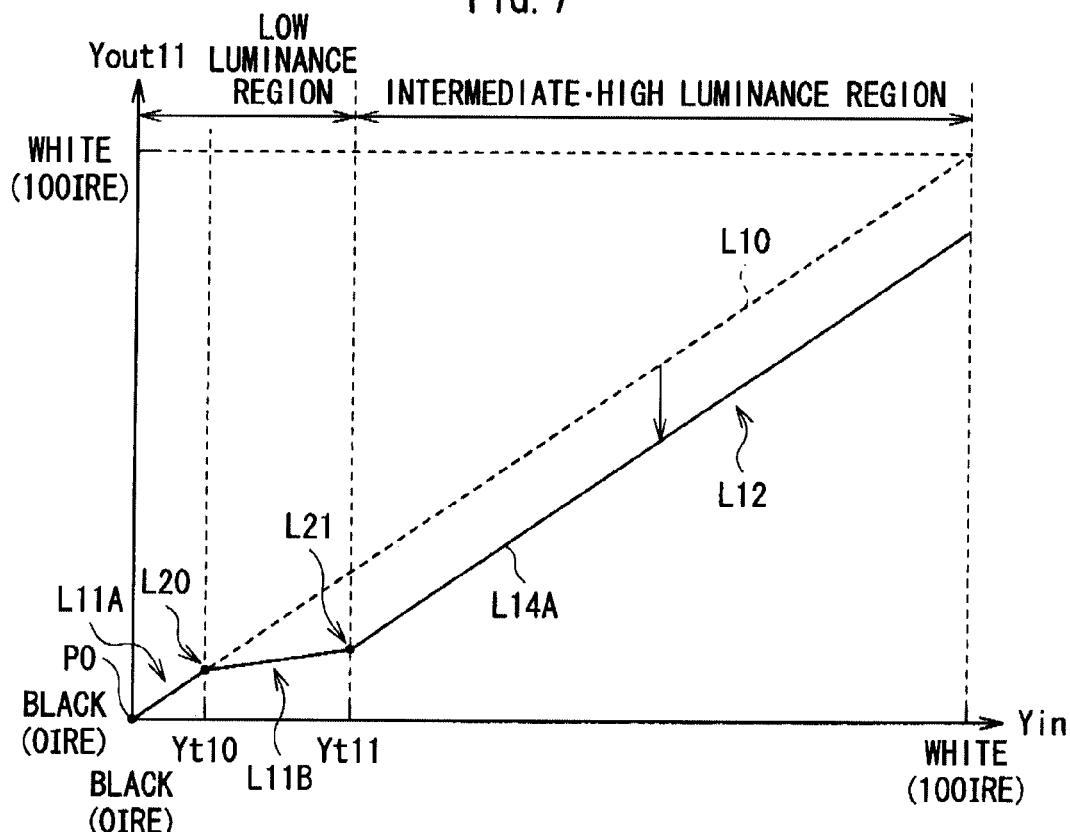
FIG. 8 is a plot showing an example of an image correction function according to a modification of the first embodiment.

More specifically, for example, in FIG. 8, the low luminance function part L11 includes a line part L11A connecting between the minimum luminance point P0 and a connection point P20 on the image correction function L10 and a line part L11B connecting between the connection point P20 and the intermediate•high luminance function part L12 at a connection point P21. In other words, in the image correction function in the first embodiment, the minimum luminance point P0 and the intermediate•high luminance function part are directly connected by a line with a fixed gradient, but in the modification, they are connected by the part L11A having the same shape as the image correction function L10 before DC level conversion.

Figure 9:
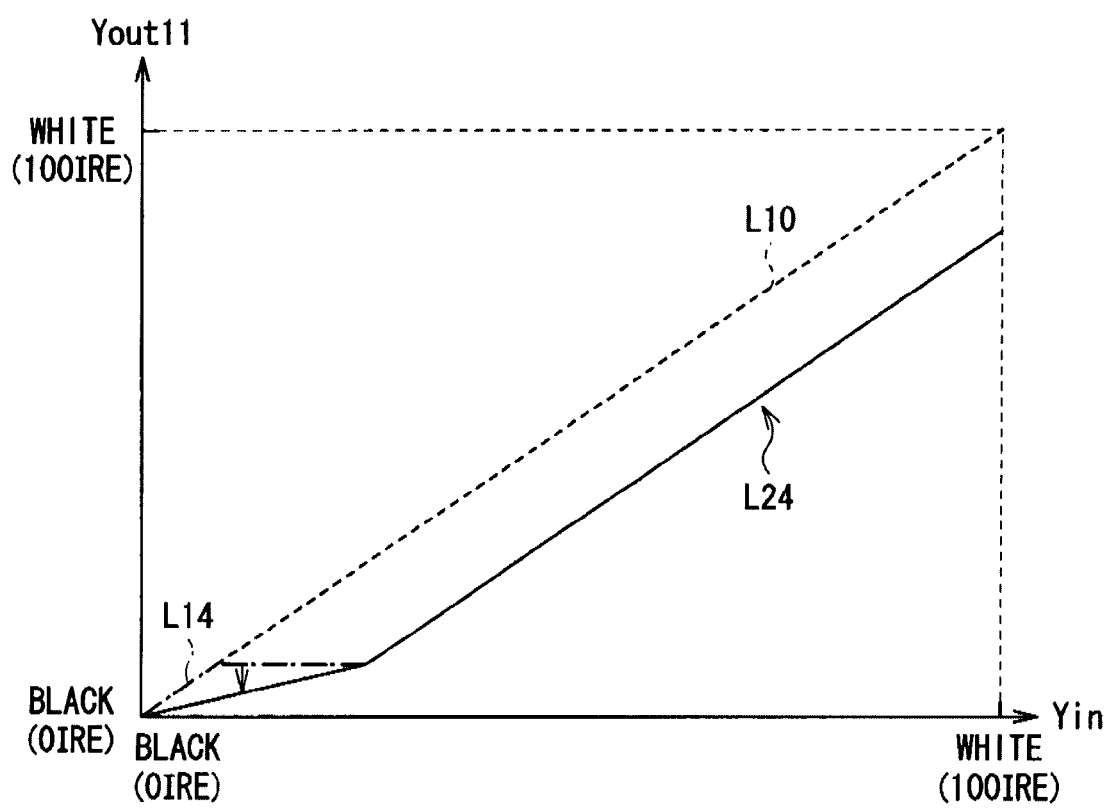
FIG. 9 is a plot for describing characteristics of the image correction function shown in FIG. 8.

Therefore, in the modification, for example, as shown by the image correction function L14 in FIG. 9, even if the luminance level of the corrected luminance signal Yout11 is further lowered by the DC transmission rate correction section 21 in the low luminance region, for example, as in the case of an image correction function L24, a loss of gray levels can be prevented.

Figure 10A:
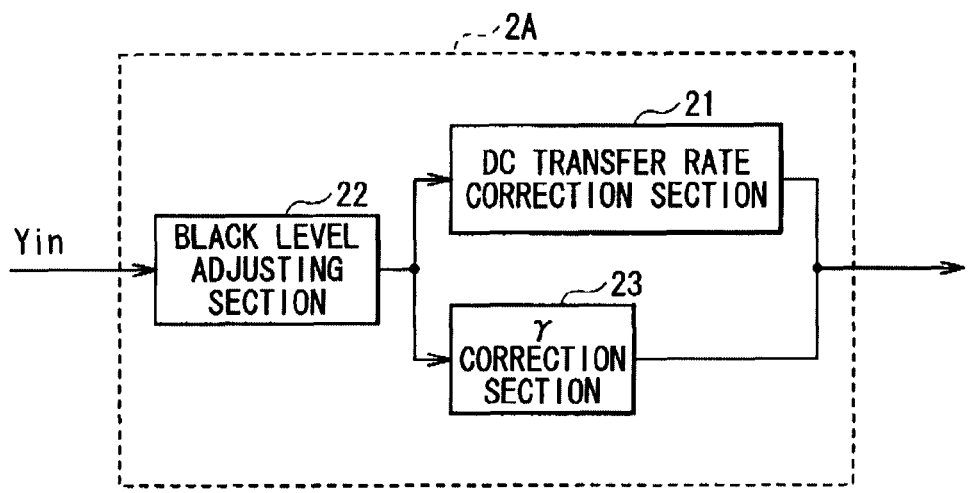
FIGS. 10A and 10B are circuit block diagrams showing structural examples of a luminance signal correction section according to the modification of the first embodiment.
Figure 10B:
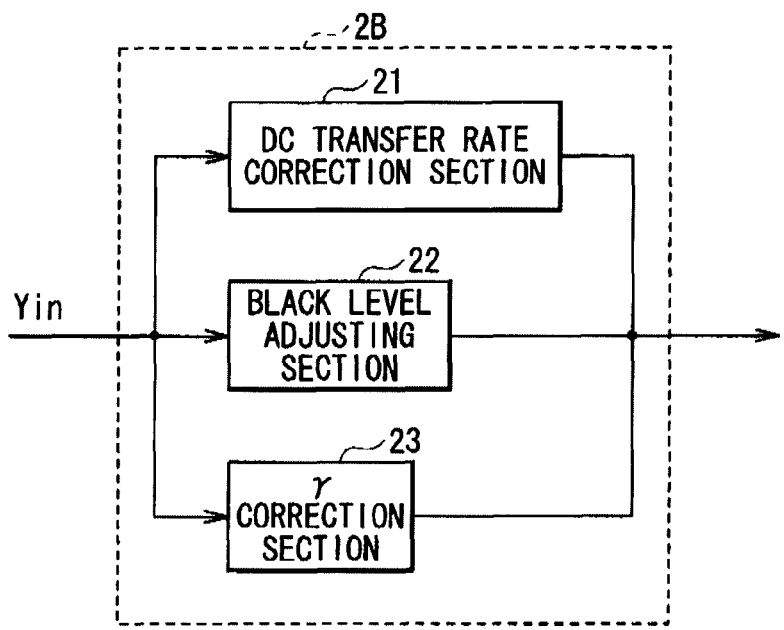

Therefore, even if the black level adjusting section 22 is arranged before the DC transmission rate correction section 21, or the DC transmission rate correction section 21, the black level adjusting section 22 and the γ correction section 23 are arranged in parallel, for example, as shown in luminance signal correction sections 2A and 2B in FIGS. 10A and 10B, respectively, as described above, a loss of gray levels can be reliably prevented.

As described above, in the modification, in the DC transmission rate correction section 21, the low luminance function part which includes the part L11A passing through the minimum luminance point P0 and having the same shape as the image correction function L10 before DC level conversion is generated, and the luminance signal is corrected by the image correction function including such a low luminance function part, so, for example, even if the luminance level in the low luminance region is further lowered after the DC transmission rate correction, a loss of gray levels can be reliably prevented. Therefore, in addition to the effects in the first embodiment, irrespective of the arrangement of the luminance signal correction section 2 or the like, gray levels in the low luminance region can be displayed more reliably, and the quality of a displayed image can be further improved.

Moreover, as the line part L11A, the image correction function L10 before DC level conversion may be used as it is, so the image correction function can be easily generated and achieved.

Further, irrespective of the arrangement of the luminance signal correction section 2 or the like, the modification can be applied to luminance signal correction sections with various configurations, so flexibility in device design can be improved.

Second Embodiment

Next, a second embodiment of the invention will be described below. An image display according to the embodiment adjusts an image correction function in a high luminance region (a white level region) in addition to the adjustment of an image correction function in a low luminance region (a black level region) described in the first embodiment.

Figure 11:
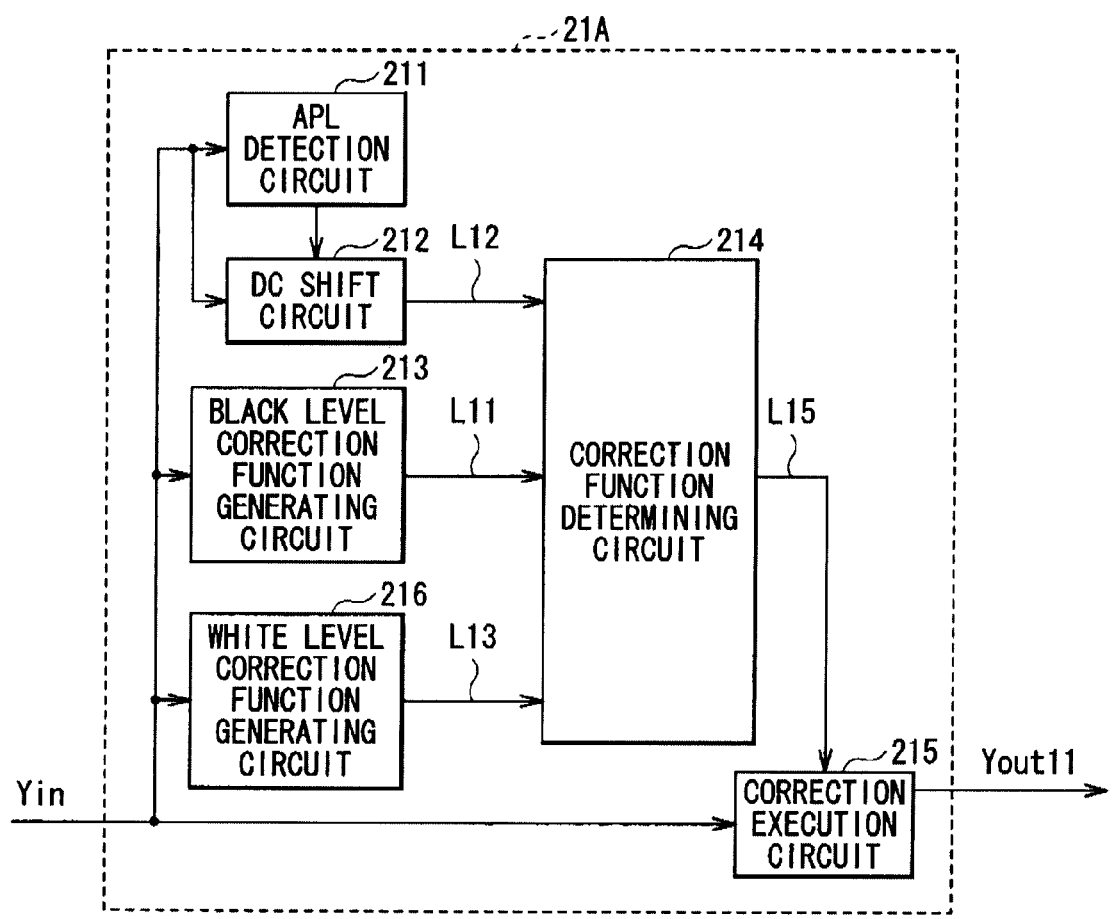
FIG. 11 is a circuit block diagram showing the configuration of a DC transmission rate correction section according to a second embodiment of the invention.

FIG. 11 shows the circuit configuration of a DC transmission rate correction section 21A according to the embodiment. The DC transmission rate correction section 21A further includes a white level correction function generating circuit 216 in the DC transmission rate correction section 21 described in the first embodiment. Like components are denoted by like numerals as of the first embodiment and will not be further described.

Figure 12:
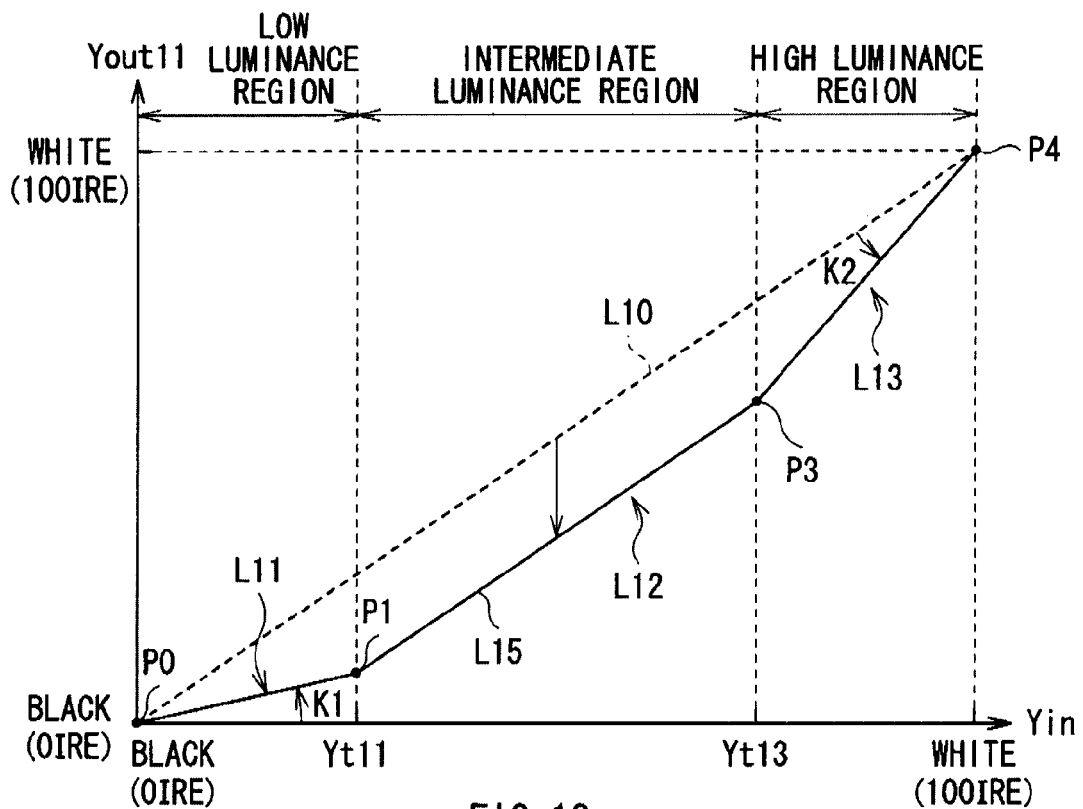
FIG. 12 is a plot showing an example of an image correction function according to the second embodiment.

For example, as shown in FIG. 12, the white level correction function generating circuit 216 generates a high luminance function part (a white level correction function) L13, which is a part continuously connecting between a maximum luminance point P4 and an intermediate luminance function part L14 while maintaining the maximum luminance point P4 at the maximum luminance point in the image correction function L10, in an image correction function (for example, an image correction function L15 in the drawing) in the DC transmission rate correction section 21A. For example, in FIG. 12, the high luminance function part L13 connects between the maximum luminance point P4 and the intermediate luminance function part L12 with a line with a predetermined change rate (a gradient K2).

The DC shift circuit 212, the black level correction function generating circuit 213, the white level correction function generating circuit 216, the correction function determining circuit 214 and the correction execution circuit 215 in the embodiment correspond to specific examples of "an image correction means" in the invention. The DC shift circuit 212, the black level correction function generating circuit 213, the white level correction function generating circuit 216 and the correction function determining circuit 214 correspond to specific examples of "a function determination means" in the invention.

By the structure of such an image correction function, in the DC transmission rate correction section 21A in the embodiment, while the luminance level of the luminance signal Yin in the intermediate luminance region is lowered according to the detected average peak level by a predetermined level, the maximum luminance point P4 is maintained in the high luminance region. Therefore, while DC level conversion is performed in the intermediate luminance region, a decline in the luminance level can be prevented in the high luminance region of the luminance signal Yout11 after the conversion.

As described above, in the embodiment, while the maximum luminance point P4 is maintained in the high luminance region, the luminance level of the luminance signal Yin in the intermediate luminance region is lowered according to the detected average peak level, so even if the DC level conversion is performed in the intermediate luminance region, a decline in the luminance level in the high luminance region after the conversion can be prevented. Therefore, in addition to the effect of preventing a loss of gray levels in the low luminance region in the first embodiment, gray levels in the high luminance region can be reliably displayed, and the quality of a displayed image can be improved.

Moreover, for example, as shown in FIG. 12, the high luminance function part is also represented by a line continuously connecting between the maximum luminance point P4 and the intermediate luminance function part, so an image correction function including these function parts can be easily generated. Therefore, the configuration of the white level correction function generating circuit 216 can be simplified, and the circuit size can be reduced.

Further, the black level correction function generating circuit 213 and the white level correction function generating circuit 216 are separately arranged, so the operation of adjusting an image correction function in the low luminance region and the operation of adjusting an image correction in the high luminance region can be individually performed.

Figure 13:
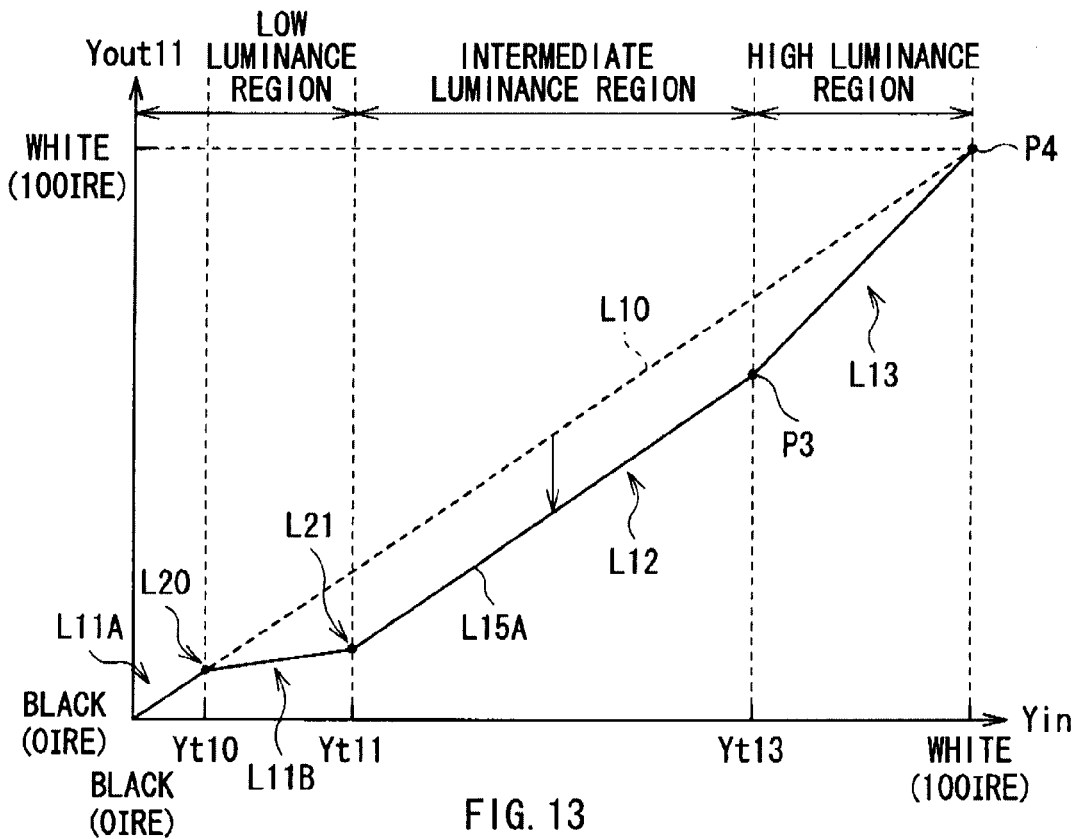
FIG. 13 is a plot showing an example of an image correction function according to a modification of the second embodiment.

Also in the image correction function described in the embodiment, for example, as shown by an image correction function L15A in FIG. 13, like the modification of the first embodiment (refer to FIG. 8), the low luminance function part L11 may include a part L11A which passes through the minimum luminance point P0 and has the same shape as the image correction function L10 before DC level conversion. In such a configuration, in addition to the effects in the embodiment, irrespective of the arrangement of the luminance signal correction section or the like, gray levels in the low luminance region can be displayed more reliably, and the quality of a displayed image can be further improved.

Although the invention is described referring to the first embodiment and the second embodiment; however, the invention is not limited to them, and can be variously modified.

Figure 14:
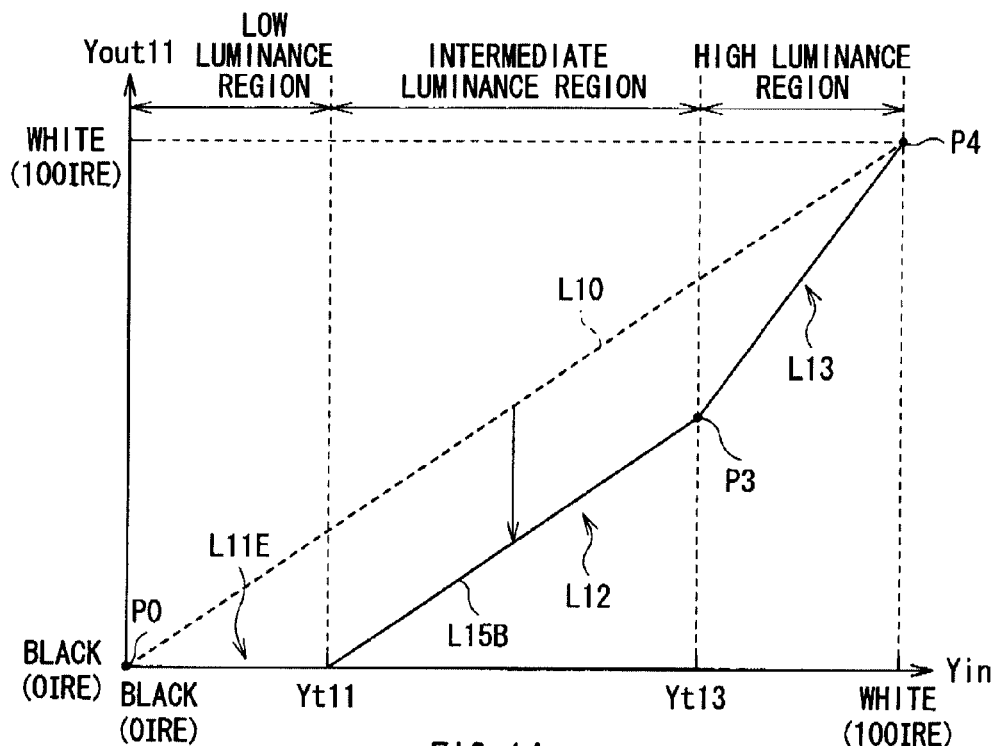
FIG. 14 is a plot showing an example of an image correction function according to a modification of the invention.
Figure 15:
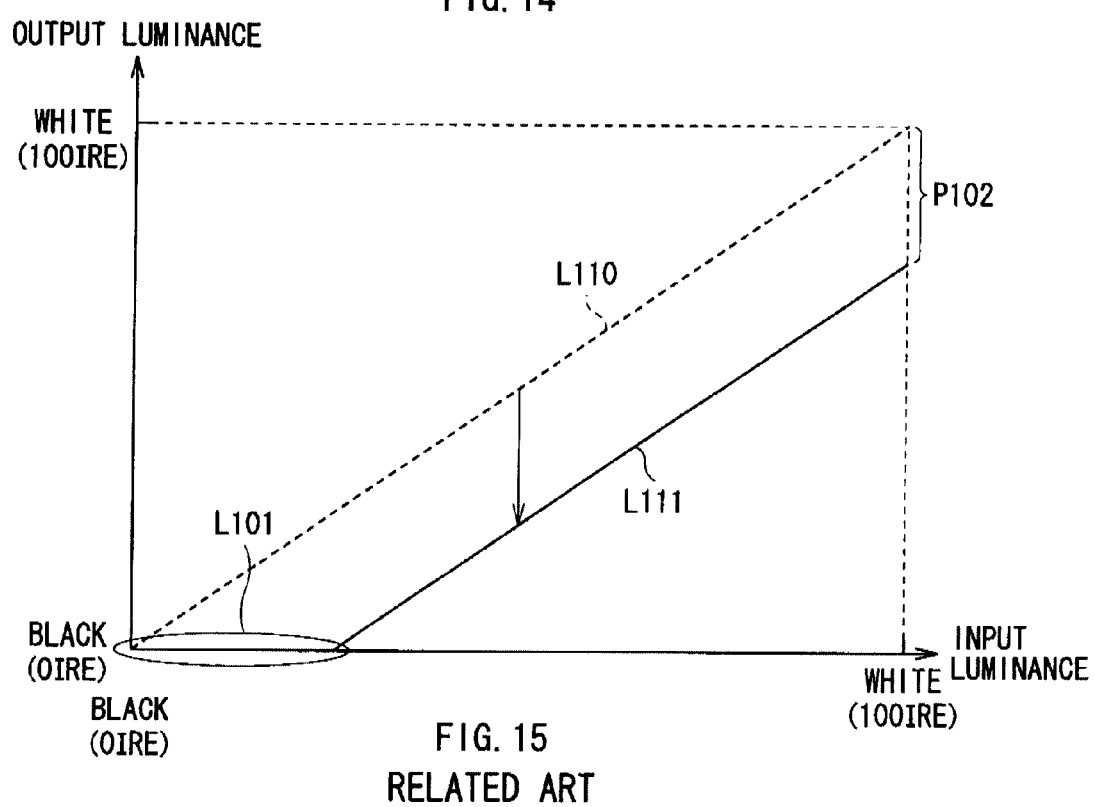
FIG. 15 is a plot for describing DC transmission rate correction in an image display in a related art.

For example, in the above embodiments, the case where the image correction function in the low luminance region (the black level region) is adjusted (the case of the first embodiment) and the case where in addition to the image correction function in the low luminance region, the image correction function in the high luminance region (the white level region) is adjusted (the case of the second embodiment) are described; however, for example, as shown by an image correction function L15B in FIG. 14, only the image correction function in the high luminance region (the white level region) may be adjusted. In such a configuration, while the DC level conversion is performed in the intermediate luminance region, a decline in the luminance level in the high luminance region after the conversion can be prevented. Therefore, gray levels in the high luminance region can be reliably displayed, and the quality of a displayed image can be further improved.

Moreover, in the above-described embodiments, the case where the low luminance function part or the high luminance function part is represented by a line with a fixed gradient is described; however, as long as a loss of gray levels in the low luminance region or a decline in the luminance level in the high luminance region can be prevented, and the low luminance function part or the high luminance function part can continuously connect to the intermediate luminance function part, the function part may be represented by a curve instead of a line.

Further, in the above-described embodiments, the luminance signal correction section 2 includes the black level adjusting section 22 and the γ correction section 23 in addition to the DC transmission rate correction section 21; however, the luminance signal correction section 2 may include only the DC transmission rate correction section 21, or the luminance signal correction section 2 may further include another luminance signal correction circuit in addition to them.

It should be understood by those skilled in the art that various modifications, combinations, sub-combinations and alterations may occur depending on design requirements and other factors insofar as they are within the scope of the appended claims or the equivalents thereof.

What is claimed is:

1. An image correction circuit comprising:
a luminance detection means for detecting an average peak level of input image data in each image frame;
an image correction means for correcting the input image data so as to lower the luminance of input image data in an intermediate luminance region according to the average peak level while reducing the luminance of input image data at a predetermined rate in at least of a low luminance region, wherein
the image correction means corrects the input image data so as to continuously connect between a maximum luminance point of the input image data and an intermediate luminance region while maintaining the maximum luminance point, and
the image correction means includes:
a function determination means for determining an image correction function including an intermediate luminance function part, a low luminance function part and a high luminance function part, the intermediate luminance function part converting the direct current level of the input image data in the intermediate luminance region according to the detected average peak level, the low luminance function part continuously connecting between a minimum luminance point of input image data and the intermediate luminance function part, the high luminance function part continuously connecting between the maximum luminance point and the intermediate luminance function part with a fixed change rate; and
a correction execution means for executing image correction on the input image data on the basis of the image correction function.

2. The image correction circuit according to claim 1, wherein
the low luminance function part includes a function part therein, the function part passing through the minimum luminance point and having the same shape as an original image correction function before the direct current level of the input image data is converted.

3. The image correction circuit according to claim 1, wherein
the low luminance function part continuously connects between the minimum luminance point and the intermediate luminance function part with a change rate except for 0.

4. The image correction circuit according to claim 3, wherein
the low luminance function part continuously connects between the minimum luminance point and the intermediate luminance function part along a line having a given gradient and passing through the minimum luminance point.

5. The image correction circuit according to claim 3, wherein
the low luminance function part continuously connects between the minimum luminance point and a point where the intermediate luminance function part assures a given function value.

6. An image correction circuit comprising:
a luminance detection means for detecting an average peak level of input image data in each image frame; and
an image correction means for correcting input image data so as to lower the luminance of input image data in an intermediate luminance region according to the average peak level while maintaining a maximum luminance point of input image data as it is, wherein
the image correction means corrects the input image data so as to continuously connect between the maximum luminance point of the input image data and an intermediate luminance region, and
the image correction means includes:
a function determination means for determining an image correction function including an intermediate luminance function part, a low luminance function part and a high luminance function part, the intermediate luminance function part converting the direct current level of the input image data in the intermediate luminance region according to the detected average peak level, the low luminance function part continuously connecting between a minimum luminance point of input image data and the intermediate luminance function part, the high luminance function part continuously connecting between the maximum luminance point and the intermediate luminance function part with a fixed change rate; and
a correction execution means for executing image correction on the input image data on the basis of the image correction function.

7. An image correction method comprising:
detecting an average peak level of input image data in each image frame;
correcting input image data so as to lower the luminance of input image data in an intermediate luminance region according to the average peak level while reducing the luminance of input image data at a predetermined rate in at least of a low luminance region, wherein
the correcting includes:
correcting the input image data so as to continuously connect between a maximum luminance point of the input image data and an intermediate luminance region while maintaining the maximum luminance point;
determining an image correction function including an intermediate luminance function, a low luminance function and a high luminance function, the intermediate luminance function converting the direct current level of the input image data in the intermediate luminance region according to the detected average peak level, the low luminance function continuously connecting between a minimum luminance point of input image data and the intermediate luminance function, the high luminance function continuously connecting between the maximum luminance point and the intermediate luminance function with a fixed change rate; and
executing image correction on the input image data on the basis of the image correction function.

8. An image correction method comprising:
detecting an average peak level of input image data in each image frame; and
correcting input image data so as to lower the luminance of input image data in an intermediate luminance region according to the average peak level while maintaining a maximum luminance point of input image data as it is, wherein
the correcting includes:
correcting the input image data so as to continuously connect between the maximum luminance point of the input image data and an intermediate luminance region;
determining an image correction function including an intermediate luminance function, a low luminance function and a high luminance function, the intermediate luminance function converting the direct current level of the input image data in the intermediate luminance region according to the detected average peak level, the low luminance function continuously connecting between a minimum luminance point of input image data and the intermediate luminance function, the high luminance function continuously connecting between the maximum luminance point and the intermediate luminance function with a fixed change rate; and executing image correction on the input image data on the basis of the image correction function.

9. An image display comprising:

a luminance detection means for detecting an average peak level of input image data in each image frame;

an image correction means for correcting input image data so as to lower the luminance of input image data in a low luminance region according to the average peak level while reducing the luminance of input image data at a predetermined rate in at least of a low luminance region, wherein the image correction means corrects the input image data so as to continuously connect between a maximum luminance point of the input image data and an intermediate luminance region while maintaining the maximum luminance point, and the image correction means includes:
a function determination means for determining an image correction function including an intermediate luminance function part, a low luminance function part and a high luminance function part, the intermediate luminance function part converting the direct current level of the input image data in the intermediate luminance region according to the detected average peak level, the low luminance function part continuously connecting between a minimum luminance point of input image data and the intermediate luminance function part, the high luminance function part continuously connecting between the maximum luminance point and the intermediate luminance function part with a fixed change rate;

a correction execution means for executing image correction on the input image data on the basis of the image correction function; and a display means for displaying an image on the basis of the corrected input image data.

10. An image display comprising:

a luminance detection means for detecting an average peak level of input image data in each image frame;

an image correction means for correcting input image data so as to lower the luminance of input image data in an intermediate luminance region according to the average peak level while maintaining a maximum luminance point of input image data as it is, wherein the image correction means corrects the input image data so as to continuously connect between the maximum luminance point of the input image data and an intermediate luminance region, and the image correction means includes:
a function determination means for determining an image correction function including an intermediate luminance function part, a low luminance function part and a high luminance function part, the intermediate luminance function part converting the direct current level of the input image data in the intermediate luminance region according to the detected average peak level, the low luminance function part continuously connecting between a minimum luminance point of input image data and the intermediate luminance function part, the high luminance function part continuously connecting between the maximum luminance point and the intermediate luminance function part with a fixed change rate;

a correction execution means for executing image correction on the input image data on the basis of the image correction function; and a display means for displaying an image on the basis of the corrected input image data.

11. An image correction circuit comprising:

a luminance detection section detecting an average peak level of input image data in each image frame; and an image correction section correcting the input image data so as to lower the luminance of input image data in an intermediate luminance region according to the average peak level while reducing the luminance of input image data at a predetermined rate in at least of a low luminance region, wherein the image correction section corrects the input image data so as to continuously connect between a maximum luminance point of the input image data and an intermediate luminance region while maintaining the maximum luminance point, and the image correction section includes:
a function determination section that determines an image correction function including an intermediate luminance function part, a low luminance function part and a high luminance function part, the intermediate luminance function part converting the direct current level of the input image data in the intermediate luminance region according to the detected average peak level, the low luminance function part continuously connecting between a minimum luminance point of input image data and the intermediate luminance function part, the high luminance function part continuously connecting between the maximum luminance point and the intermediate luminance function part with a fixed change rate; and a correction execution section that executes image correction on the input image data on the basis of the image correction function.

12. An image correction circuit comprising:

a luminance detection section detecting an average peak level of input image data in each image frame; and an image correction section correcting input image data so as to lower the luminance of input image data in an intermediate luminance region according to the average peak level while maintaining a maximum luminance point of input image data as it is, wherein the image correction section corrects the input image data so as to continuously connect between the maximum luminance point of the input image data and an intermediate luminance region, and the image correction section includes:
a function determination section that determines an image correction function including an intermediate luminance function part, a low luminance function part and a high luminance function part, the intermediate luminance function part converting the direct current level of the input image data in the intermediate luminance region according to the detected average peak level, the low luminance function part continuously connecting between a minimum luminance point of input image data and the intermediate luminance function part, the high luminance function part continuously connecting between the maximum luminance point and the intermediate luminance function part with a fixed change rate; and a correction execution section that executes image correction on the input image data on the basis of the image correction function.

13. An image display comprising:

a luminance detection section detecting an average peak level of input image data in each image frame;

an image correction section correcting input image data so as to lower the luminance of input image data in a low luminance region according to the average peak level while reducing the luminance of input image data at a predetermined rate in at least of a low luminance region, wherein the image correction section corrects the input image data so as to continuously connect between a maximum luminance point of the input image data and an intermediate luminance region while maintaining the maximum luminance point, and the image correction section includes:

a function determination section that determines an image correction function including an intermediate luminance function part, a low luminance function part and a high luminance function part, the intermediate luminance function part converting the direct current level of the input image data in the intermediate luminance region according to the detected average peak level, the low luminance function part continuously connecting between a minimum luminance point of input image data and the intermediate luminance function part, the high luminance function part continuously connecting between the maximum luminance point and the intermediate luminance function part with a fixed change rate; and a correction execution section that executes image correction on the input image data on the basis of the image correction function; and a display section displaying an image on the basis of the corrected input image data.

14. An image display comprising:

a luminance detection section detecting an average peak level of input image data in each image frame;

an image correction section correcting input image data so as to lower the luminance of input image data in an intermediate luminance region according to the average peak level while maintaining a maximum luminance point of input image data as it is, wherein the image correction section corrects the input image data so as to continuously connect between the maximum luminance point of the input image data and an intermediate luminance region, and the image correction section includes:

a function determination section that determines an image correction function including an intermediate luminance function part, a low luminance function part and a high luminance function part, the intermediate luminance function part converting the direct current level of the input image data in the intermediate luminance region according to the detected average peak level, the low luminance function part continuously connecting between a minimum luminance point of input image data and the intermediate luminance function part, the high luminance function part continuously connecting between the maximum luminance point and the intermediate luminance function part with a fixed change rate;

a correction execution section that executes image correction on the input image data on the basis of the image correction function; and a display section displaying an image on the basis of the corrected input image data.

* * * * *